(12) United States Patent
Lee et al.

(10) Patent No.: US 12,237,496 B2
(45) Date of Patent: Feb. 25, 2025

(54) NEGATIVE ELECTRODE FOR LITHIUM SECONDARY BATTERY AND LITHIUM SECONDARY BATTERY COMPRISING SAME

(71) Applicant: SAMSUNG SDI CO., LTD., Yongin-si (KR)

(72) Inventors: Jinhyon Lee, Yongin-si (KR); Hongjeong Kim, Yongin-si (KR); Hyeri Eom, Yongin-si (KR); Sangjun Lee, Yongin-si (KR); Daeseop Lim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 704 days.

(21) Appl. No.: 17/605,057

(22) PCT Filed: Apr. 16, 2020

(86) PCT No.: PCT/KR2020/005073
§ 371 (c)(1),
(2) Date: Oct. 20, 2021

(87) PCT Pub. No.: WO2020/218773
PCT Pub. Date: Oct. 29, 2020

(65) Prior Publication Data
US 2022/0209217 A1    Jun. 30, 2022

(30) Foreign Application Priority Data
Apr. 24, 2019    (KR) .................. 10-2019-0047927

(51) Int. Cl.
*H01M 4/133*    (2010.01)
*H01M 4/02*    (2006.01)
(Continued)

(52) U.S. Cl.
CPC ........... *H01M 4/133* (2013.01); *H01M 4/364* (2013.01); *H01M 4/366* (2013.01); *H01M 4/386* (2013.01);
(Continued)

(58) Field of Classification Search
CPC ...... H01M 4/364; H01M 4/366; H01M 4/386; H01M 4/387; H01M 4/485; H01M 4/587;
(Continued)

(56) References Cited

U.S. PATENT DOCUMENTS

2013/0260217 A1    10/2013    Matsui et al.
2014/0065478 A1    3/2014    Mitsuhashi et al.
(Continued)

FOREIGN PATENT DOCUMENTS

JP    2013-069579 A    4/2013
JP    2013-089574 A    5/2013
(Continued)

OTHER PUBLICATIONS

International Search Report dated Jul. 17, 2020 for PCT/KR2020/005073.
(Continued)

*Primary Examiner* — Eugenia Wang
(74) *Attorney, Agent, or Firm* — Lee IP Law, P.C.

(57) ABSTRACT

The present invention relates a negative electrode for a lithium secondary battery, and a lithium secondary battery comprising same, wherein the negative electrode for a lithium secondary battery comprises a current collector, and a negative electrode active material layer including a first layer formed on the current collector and a second layer formed on the first layer, the first layer containing a first carbon-based negative electrode active material, and the second layer containing a second carbon-based negative electrode active material, wherein the degree of divergence
(Continued)

(DD) value of the first layer is 30-90% of the DD value of the negative electrode active material layer, the DD value is defined by formula 1 below.

DD (Degree of Divergence)=$(I_a/I_{total})*100$ [Formula 1]

(In formula 1, $I_a$ is the sum of peak intensities of peaks at out-of plane angles as measured by XRD with CuKα, and $I_{total}$ is the sum of peak intensities of peaks at all angles as measured by XRD with CuKα).

13 Claims, 3 Drawing Sheets

(51) Int. Cl.
  *H01M 4/36* (2006.01)
  *H01M 4/38* (2006.01)
  *H01M 4/485* (2010.01)
  *H01M 4/587* (2010.01)
  *H01M 10/0525* (2010.01)

(52) U.S. Cl.
  CPC ........... *H01M 4/387* (2013.01); *H01M 4/485* (2013.01); *H01M 4/587* (2013.01); *H01M 10/0525* (2013.01); *H01M 2004/021* (2013.01); *H01M 2004/027* (2013.01)

(58) Field of Classification Search
  CPC ....... H01M 10/0525; H01M 2004/021; H01M 2004/027
  See application file for complete search history.

(56) References Cited

U.S. PATENT DOCUMENTS

| | | |
|---|---|---|
| 2014/0072848 A1 | 3/2014 | Hagiwara |
| 2014/0170487 A1 | 6/2014 | Takahata et al. |
| 2014/0363736 A1 | 12/2014 | Kim et al. |
| 2018/0123120 A1 | 5/2018 | Lee et al. |
| 2018/0123131 A1 | 5/2018 | Lee et al. |
| 2018/0287145 A1 | 10/2018 | Lee et al. |
| 2019/0305308 A1 | 10/2019 | Lee et al. |
| 2020/0388832 A1 | 12/2020 | Kwon et al. |

FOREIGN PATENT DOCUMENTS

| | | | |
|---|---|---|---|
| JP | 2013-131297 A | 7/2013 | |
| JP | 2014-137879 A | 7/2014 | |
| JP | 5601550 B2 | 10/2014 | |
| JP | 5652682 B2 | 1/2015 | |
| JP | 5783433 B2 | 9/2015 | |
| KR | 10-2012-0054243 A | 5/2012 | |
| KR | 10-2014-0138079 A | 12/2014 | |
| KR | 10-2018-0004587 A | 1/2018 | |
| KR | 10-2018-0035693 A | 4/2018 | |
| KR | 10-2018-0047846 A | 5/2018 | |
| KR | 10-2018-0048131 A | 5/2018 | |
| KR | 10-2018-0062390 A | 6/2018 | |
| WO | WO-2018101765 A1 * | 6/2018 | ........ H01M 10/0525 |

OTHER PUBLICATIONS

Chinese Office action dated Jan. 11, 2024.
Korean Office action dated Aug. 23, 2022.
European Search Report dated Dec. 12, 2022.
European Office Action dated Aug. 2, 2023, of the corresponding European Patent Application No. 20794839.9.

* cited by examiner

NEGATIVE ELECTRODE FOR LITHIUM SECONDARY BATTERY AND LITHIUM SECONDARY BATTERY COMPRISING SAME

CROSS REFERENCE TO RELATED APPLICATIONS

This is the U.S. national phase application based on PCT Application No. PCT/KR2020/005073, filed Apr. 16, 2020, which is based on Korean Patent Application No. 10-2019-0047927, filed Apr. 24, 2019, the entire contents of all of which are hereby incorporated by reference.

TECHNICAL FIELD

It relates to a negative electrode for lithium secondary battery and a lithium secondary battery including the same.

BACKGROUND ART

A lithium secondary battery has recently drawn attention as a power source for small portable electronic devices, and the lithium secondary battery uses an organic electrolyte solution and thereby, has twice or more as high a discharge voltage as a conventional battery using an alkali aqueous solution and accordingly, has high energy density.

As for a positive electrode active material of a rechargeable lithium battery, oxides including lithium and a transition metal with a structure capable of intercalating/deintercalating lithium ions, such as $LiCoO_2$, $LiMn_2O_4$, $LiNi_{1-x}Co_xO_2$ (0<x<1), and the like has been mainly used.

As for negative electrode active materials, various carbon-based materials capable of intercalating/deintercalating lithium ions such as artificial graphite, natural graphite, hard carbon, and the like have been used, and recently, a non-carbon-based negative electrode active material such as silicon or tin has been researched in order to obtain high capacity.

Technical Solution

One embodiment provides a negative electrode for a lithium secondary battery exhibiting excellent electrochemical characteristics.

Another embodiment provides a lithium secondary battery including the negative electrode.

One embodiment provides a negative electrode for a lithium secondary battery including: a current collector; and a negative electrode active material layer including a first layer disposed on both sides of the current collector and having a first carbon-based negative electrode active material, and a second layer disposed on the first layer and having a second carbon-based negative electrode active material, wherein a DD (Degree of Divergence) value of the first layer is 30% to 90% of a DD value of the negative electrode active material layer, and the DD value is defined by Equation 1.

$$DD \text{ (Degree of Divergence)} = (I_a/I_{total}) * 100 \quad \text{[Equation 1]}$$

(In Equation 1,
$I_a$ is a sum of peak intensities at non-planar angles measured by XRD using a CuKα ray, and
$I_{total}$ is a sum of peak intensities at all angles measured by XRD using a CuKα ray.)

The DD value of the first layer may be 70% to 90% of the DD value of the negative electrode active material layer.

A total thickness of the first layer disposed on both sides may be 80 μm to 800 μm. Furthermore, the total thickness on both sides of the second layer may be 20 μm to 200 μm. In addition, the total thickness of the negative electrode active material layer may be 100 μm to 1000 μm.

The total thickness of both sides of the first layer may be 80% or less of the total thickness of the negative electrode active material layer, or may be 20% to 80%. The DD value of the negative electrode active material layer may be 19 to 60, and the DD value of the first layer may be 18 to 54.

The $I_a$ may be a sum of peak intensities at 2θ=42.4±0.2°, 43.4±0.2°, 44.6±0.2°, and 77.5±0.2° measured by XRD using a CuKα ray, and the $I_{total}$ may be a sum of peak intensities at 2θ=26.5±0.2°, 42.4±0.2°, 43.4±0.2°, 44.6±0.2°, 54.7±0.2°, and 77.5±0.2° measured by XRD using a CuKα ray.

The peak intensities may be a peak integral area value.

The first or the second carbon-based negative electrode active material may be artificial graphite or a mixture of artificial graphite and natural graphite.

Furthermore, the first layer or the second layer may further include a Si-based negative electrode active material, a Sn-based negative electrode active material, a lithium vanadium oxide, or a combination thereof.

Another embodiment provides a lithium secondary battery including: the negative electrode; a positive electrode including a positive electrode active material; and an electrolyte.

Other embodiments are included in the following detailed description.

Advantageous Effects

A negative electrode for a lithium secondary battery according to an embodiment may provide a rechargeable lithium battery having improved battery characteristics.

MODE FOR INVENTION

Hereinafter, embodiments of the present invention are described in detail. However, these embodiments are exemplary, the present invention is not limited thereto and the present invention is defined by the scope of claims.

A negative electrode for a lithium secondary battery includes a current collector and a negative electrode active material layer, and the negative electrode active material layer includes a first layer disposed on both sides of the current collector and having a first carbon-based negative electrode active material, and a second layer disposed on the first layer and having a second carbon-based negative electrode active material.

Herein, a DD (Degree of Divergence) value of the first layer may be 30% to 90% of a DD value of the negative electrode active material layer, that is, the total negative electrode active material layer which is the sum of the first layer and the second layer, and according to one embodiment, may be 70% to 90%.

The DD value may be defined by Equation 1.

$$DD \text{ (Degree of Divergence)} = (I_a/I_{total}) * 100 \quad \text{[Equation 1]}$$

In Equation 1, $I_a$ is a sum of peak intensities at non-planar angles measured by XRD using a CuKα ray, and $I_{total}$ is a sum of peak intensities at all angles measured by XRD using a CuKα ray.

Herein, the non-planar angles denote $2\theta=42.4\pm0.2°$, $43.4\pm0.2°$, $44.6\pm0.2°$, and $77.5\pm0.2°$ when measured by XRD using a CuKα ray, that is, a (100) plane, a (101)R plane, a (101)H plane, and a (110) plane. In general, graphite has a structure classified into a rhombohedral structure and a hexagonal structure having an ABAB type of stacking sequence according to a stacking order of graphene layers, and the R plane denotes the rhombohedral structure, while the H plane denotes the hexagonal structure.

In addition, all the angles denote $2\theta=26.5\pm0.2°$, $42.4\pm0.2°$, $43.4\pm0.2°$, $44.6\pm0.2°$, $54.7\pm0.2°$, and $77.5\pm0.2°$ when measured by XRD using a CuKα ray, that is, a (002) plane, a (100) plane, a (101)R plane, a (004) plane, and a (110) plane. A peak at $2\theta=43.4\pm0.2°$ may also be considered to appear by overlapping a peak of a (101)R plane of a carbon-based material with another peak of a (111) plane of a current collector, for example, Cu.

In general, peak intensity indicates a height of a peak or an integral area of the peak, and according to an embodiment, the peak intensity indicates the integral area of a peak.

In an embodiment, the XRD is measured under a measurement condition of $2\theta=10°$ to $80°$, a scan speed (°/S) of 0.044 to 0.089, and a step size (°/step) of 0.013 to 0.039 by using a CuKα ray as a target ray but removing a monochromator to improve a peak intensity resolution.

Figure 1:
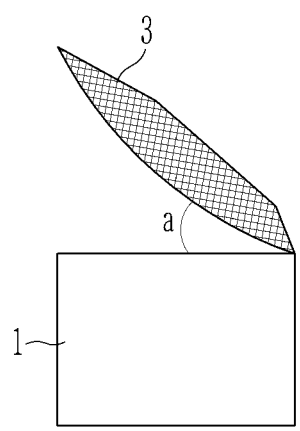
FIG. 1 is a schematic view showing orientations according to an embodiment of the present invention.

The DD values indicates that the negative electrode active materials included in the first layer and the second layer are oriented at a predetermined angle, and a larger value indicates that the negative electrode active material is well oriented. That is, as schematically shown in FIG. 1, as the DD values is increased, an angle (a) is increased when the negative electrode active material 3 is oriented to one side of the substrate 1 with the angle (a). Furthermore, the DD value is maintained after charges and discharges.

In one embodiment, the DD value of the first layer is smaller than the DD value of the negative electrode active material layer, and specifically, the DD value of the first layer corresponds to 30% to 90% of the DD value of the negative electrode active material layer (first layer+second layer), and more desirably, 70% to 90%, which indicates to a higher orientation of the negative electrode active material of the second layer. As such, the higher orientation degree of the negative electrode active material of the second layer which corresponds to a surface portion of the negative electrode active material layer indicates that, i.e., the negative electrode active material is not horizontally and parallel to the current collector and is positioned at a standing state at a predetermined angle to the current collector, and this allows to readily immerse the electrolyte to the negative electrode active material layer, to easily transfer lithium ions, and to shorten a transferring path, and thus, the resulting negative electrode may be suitably applied as a high-power battery, and may exhibit excellent high-rate capability characteristics.

If the DD value of the first layer is smaller than 30% of the DD value of the negative electrode active material layer, the impregnation of the electrolyte may be deteriorated, and in addition, the lithium ions may not be completely intercalated into the first layer during the charge at high rates, whereas if the DD value of the first layer is more than 90% of the DD value of the negative electrode active material layer, shortcomings related to contacts between particles to increase electron resistance of the negative electrode occur.

Furthermore, if the DD values are different for each zones in the one layer, rather than the DD value of the first layer being different from the DD value of the second layer which is presented by being separately stacked therewith, as in one embodiment, migration of a binder may be generated according to an orientation part and a non-orientation part during drying which causes a decrease in adhesion and an increase in ionic resistance of the negative electrode, and in addition, the ability of the electrolyte impregnation may be changed according to the orientated part and the non-orientated part which increase non-uniformity of the reaction, causing a partially non-uniform thickness at full charge, and precipitation of lithium during charging at high rates of 1 C or more.

The DD value of the negative electrode active material layer may be 19 to 60, and the DD value of the first layer may be 18 to 54. When the DD values of the negative electrode active material layer and the first layer have the relationship and satisfy the above range, the electrolyte may be effectively impregnated into the negative electrode active material layer, lithium ions may be readily transferred, and the transferring path may be shortened, and thus, the negative electrode including the same may be applied as a high-power battery and the electron transferring resistance may be reduced in the negative electrode, thereby improving high rate characteristics. If the DD value of the negative electrode active material layer or the DD value of the first layer are out of the range, the impregnation of the electrolyte may be deteriorated and lithium ions may be not completely intercalated into the first layer at high-rate charge.

The total thickness of both sides of the first layer may be 80 μm to 800 μm. The total thickness of both sides of the first layer may be 80% or less of the negative electrode active material layer, and in one embodiment, may be 20% to 80%. When the thickness ratio of the negative electrode active material layer and the first layer is within in the range, the impregnation of the electrolyte and the electron transferring resistance may be both improved.

Furthermore, the thickness of both sides of the second layer may be 20 μm to 200 μm. When the thickness of the second layer is within the range, the electrolyte is readily impregnated in the negative electrode to reduce the ionic transportation resistance in the negative electrode.

In addition, the total thickness of the negative electrode active material layer, i.e., a sum of the thickness of both sides of the first layer and the thickness of both sides of the second layer, may be 100 μm to 1000 μm. As such, the negative electrode active material layer may be formed at a thickness of a maximum of 1000 μm which is extremely larger than the general maximum thickness of the negative electrode active material layer of 200 μm. In one embodiment, the DD values of the first layer which is an inner layer and the negative electrode active material layer are controlled to improve the electrolyte impregnation, and thus, a thick layer with the thicker thickness is formed, the rapid charge and discharge may effectively occur so that it may be applicable for a high-power battery.

The thicknesses of the negative electrode active material layer and the first layer refers to a thickness after compressing and vacuum-drying in the negative electrode preparation. The vacuum-drying may be performed under a pressure of about 0.03 atm to about 0.06 atm at about 100° C. to about 160° C.

In one embodiment, the DD value is obtained by charging and discharging a rechargeable lithium battery including the negative electrode, disassembling the battery when fully discharged to obtain the negative electrode, and measuring XRD of the negative electrode. The DD value of the first layer is obtained by taking off the negative electrode active material layer using a tape after charge and discharge and measuring an XRD to the active material layer attached to the current collector.

Herein, the charge and discharge are once to twice performed at about 0.1 C to about 0.2 C.

The negative electrode may have a peak intensity ratio, at a (004) plane relative to a (002) plane, that is, $I_{(004)}/I_{(002)}$, of greater than or equal to about 0.04, and specifically, greater than or equal to about 0.04 to less than or equal to about 0.07, when XRD is measured by using a CuKα ray. When the negative electrode has $I_{(004)}/I_{(002)}$ of greater than or equal to about 0.04, DC internal resistance may not be increased, but rate capabilities, and particularly high rate capability, may be improved, and cycle-life characteristics may also be improved.

In addition, the negative electrode may have a peak intensity ratio at a (110) plane relative to a (004) plane, that is, $I_{(110)}/I_{(004)}$, of greater than or equal to about 0.3 and specifically, greater than or equal to about 0.3 and less than or equal to about 0.7 when XRD is measured by using a CuKα ray. When the negative electrode has $I_{(110)}/I_{(004)}$ of greater than or equal to about 0.3, DC internal resistance may not be increased, but rate capabilities, and particularly, high rate capability, may be improved, and cycle-life characteristics may also be improved. In an embodiment, since the DD value is a peak value at a non-plane relative to a peak value at all the angles and thus not linked with $I_{(110)}/I_{(004)}$, the $I_{(110)}/I_{(004)}$ of greater than or equal to about 0.3 does not mean the DD values of the first layer and the second layer within the above range.

A BET specific surface area of the negative electrode may be less than about 5.0 m$^2$/g, or about 0.6 m$^2$/g to about 2.0 m$^2$/g. When the BET specific surface area of the negative electrode is less than about 5.0 m$^2$/g, the electrochemical cycle-life characteristics of the battery may be improved. In an embodiment, the BET is measured by charging and discharging a lithium secondary battery including the negative electrode, fully discharging the battery down to less than or equal to about 3 V, disassembling the battery to obtain the negative electrode, cutting the negative electrode into a predetermined size, and putting the cut negative electrode in a BET sample holder in a nitrogen gas adsorption method.

The negative electrode may have a cross-section loading level (L/L) of about 6 mg/cm$^2$ to about 65 mg/cm$^2$.

The negative electrode active material, the carbon-based negative electrode active material may be artificial graphite, or a mixture of artificial graphite and natural graphite. When the negative electrode active material is a crystalline carbon-based material such as artificial graphite or a mixture of natural graphite and artificial graphite, the crystalline carbon-based material has more developed crystalline characteristics than an amorphous carbon-based active material and thus may further improve orientation characteristics of a carbon material in an electrode about an external magnetic field. The artificial graphite or natural graphite may be unspecified shaped, sheet-shaped, flake-shaped, spherically-shaped, fiber-shaped, or a combination thereof without a particular limit. In addition, the artificial graphite is mixed with the natural graphite in a ratio of about 70:30 wt % to about 95:5 wt %.

Furthermore, the negative electrode active material layer may include at least one non-carbon-based material from a Si-based negative electrode active material, a Sn-based negative electrode active material, or a lithium vanadium oxide negative electrode active material. When the negative electrode active material layer further includes these materials, that is, the carbon-based negative electrode active material as a first negative electrode active material and the non-carbon-based material as a second negative electrode active material, the first and second negative electrode active materials may be mixed in a weight ratio of about 50:50 to about 99:1.

The Si-based negative electrode active material may be Si, a Si—C composite, SiO$_x$ (0<x<2), and an Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof but not Si), and the Sn-based negative electrode active material is selected from Sn, SnO$_2$, an Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, but not Si), and the like, and also, a mixture of at least one thereof with SiO$_2$. The elements Q and R may be selected from Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

In the first layer, the amount of the negative electrode active material may be about 95 wt % to about 99 wt % based on the total weight of the first layer, and in the second layer, the amount of negative electrode active material may be about 95 wt % to about 99 wt % based on the total weight of the second layer.

The first layer and the second layer include a binder, and may further include a conductive material. In the first layer or the second layer, each amount of the binder may be about 1 wt % to about 5 wt % based on the total weight of the first layer or the second layer. Furthermore, when the conductive material is further included, about 90 wt % to about 98 wt % of the negative electrode active material, about 1 wt % to about 5 wt % of the binder, and about 1 wt % to about 5 wt % of the conductive material may be included.

The binder improves binding properties of negative electrode active material particles with one another and with a current collector. The binder may be a non-aqueous binder, an aqueous binder, or a combination thereof.

The non-aqueous binder may be an ethylene propylene copolymer, polyacrylonitrile, polystyrene, polyvinylchloride, carboxylated polyvinylchloride, polyvinylfluoride, polyurethane, polytetrafluoroethylene, polyvinylidene fluoride, polyethylene, polypropylene, polyamide imide, polyimide, or a combination thereof.

The aqueous binder may be a styrene-butadiene rubber (SBR), an acrylated styrene-butadiene rubber (ABR), an acrylonitrile-butadiene rubber, an acrylic rubber, a butyl rubber, a fluorine rubber, an ethylene oxide-containing polymer, polyvinyl pyrrolidone, polyepichlorohydrin, polyphosphazene, an ethylene propylene diene copolymer, polyvinylpyridine, chlorosulfonated polyethylene, latex, polyester resin, an acrylic resin, a phenolic resin, an epoxy resin, polyvinyl alcohol, or a combination thereof.

When the aqueous binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metal may be Na, K, or Li. The thickener may be included in an amount of about 0.1 parts by weight to about 3 parts by weight based on 100 parts by weight of the negative electrode active material.

The conductive material is included to provide electrode conductivity, and any electrically conductive material may be used as a conductive material unless it causes a chemical change. Examples of the conductive material may be a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof, but is not limited thereto.

The negative electrode according one embodiment may be prepared by applying a magnetic filed when a negative electrode active material composition is coated on a current collector. The negative electrode active material layer preparation will be illustrated with reference to FIG. 2.

Figure 2:
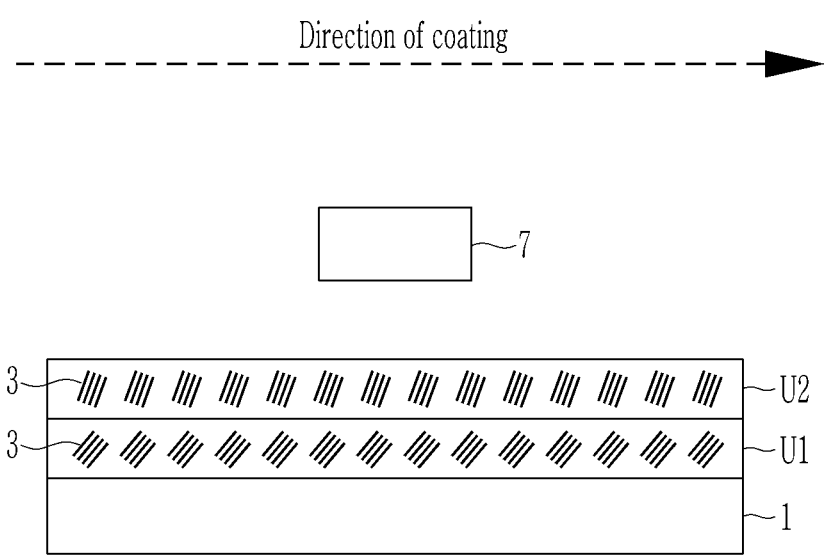
FIG. 2 is a schematic view for orientations of the first layer and the second layer according to one embodiment of the present invention.

As shown in FIG. 2, a current collector 1 is disposed beneath a magnet 7 and a first layer composition including a negative electrode active material 3 is coated on the current collector 1. After coating the first layer composition, drying is performed to prepare a first layer U1. Thereafter, a second layer composition including a negative electrode active material 3 is coated on the first layer, and dried to prepare a second layer U2. Alternatively, the first layer and the second layer preparations may be simultaneously produced by coating the first layer composition and the second layer composition together. Herein, the coating may be performed together with drying so that the coating and the drying of the first layer composition and the second layer composition simultaneously occur, and thus, the first layer and the second layer are not prepared as one layer without a boundary and may be separately prepared.

If the first layer and the second layer composition are formed on both sides of the current collector, one first layer is one side of the current collector, the other first layer is formed on a corresponding side on which the first layer is not formed, to the side on which the first layer is formed, and second layers are formed on the two first layers, and alternatively, a first layer and a second layer may be sequentially formed on one side of the current collector, and a first layer and a second layer may then be sequentially formed on the other side of the current collector.

The magnet may have strength of a magnetic filed of about 1000 Gauss to about 10,000 Gauss. In addition, the negative electrode active material composition may be coated on the current collector and maintained for about 3 seconds to about 9 seconds, that is, may be exposed to the magnetic field for about 3 seconds to about 9 seconds.

When such applying of the magnetic filed is performed, in particular, when the coating process is performed while the current collector is moved, the magnetic field (magnetic flux) by the magnet may be formed vertically with the current collector, but since the magnetic field according to a coating speed (a speed of moving the current collector) is formed at a predetermined angle as a vector function, the negative electrode active material included in the first and second layer compositions may stand, that is, may be oriented at the predetermined angle on the surface of the current collector.

In particular, when the coating process is performed while the current collector is moved, the magnetic field (magnetic flux) by the magnet may be formed vertically with the current collector, but since the magnetic field according to a coating speed (a speed of moving the current collector) is formed at a predetermined angle as a vector function, the negative electrode active material included in the negative electrode active material composition may stand, that is, may be oriented at the predetermined angle on the surface of the current collector.

Herein, the viscosities of the first layer composition and the second layer composition are adjusted to form the first layer and the second layer with different DD values therewith, even though the same magnetic fields are applied for the first layer and the second layer preparations, the degree of the orientation of the negative electrode active materials in the first layer U1 and the second layer U2 may be differentiated, as shown in FIG. 2.

That is, the first layer composition may have a viscosity of about 2500 cps to 3500 cps at room temperature (about 20° C. to about 25° C.). The second layer composition may have a viscosity of about 2000 cps to about 3000 cps at room temperature (about 20° C. to about 25° C.). The viscosities of the first layer composition and the second layer composition may be controlled within the range, but the viscosity of the first layer composition may be selected to be higher than the viscosity of the second layer composition. For example, the viscosity of the first layer composition may suitably be higher by about 100 cps to about 1500 cps than the viscosity of the second layer composition, and in this case, the first layer and the second layer with the desired DD values may be obtained.

When the viscosities of the first layer composition and the second layer composition satisfy the range, the first layer and the second layer with the desired DD values may be obtained. Lower viscosity of the first layer composition than the range cause an extreme increase in a degree of verticality of the first carbon-based negative electrode active material included in the first layer, that is, the angle as shown in FIG. 1 to cause bad particle contact of the negative electrode active material, and thus, the electron transportation resistance may be increased, whereas higher viscosity than the range may cause an inability to orientate, that is, the first negative electrode active material included in the first layer may be substantially horizontally positioned with respect to the current collector.

If the second layer composition has a lower viscosity than the range, the second carbon-based negative electrode active material included in the second layer has an extremely high degree of verticality which causes bad contact of the negative electrode active material particles, and thus the electron transportation resistance may be increased, whereas if the viscosity is larger than the range, the orientation may insufficiently occur to deteriorate the electrolyte impregnation.

The first layer composition and the second layer composition may be respectively produced by mixing the negative electrode active material, the binder, and optionally the conductive material in a solvent.

The negative electrode active material is the same as the above description.

Thereafter, after the first layer and the second layer are formed, compression and a vacuum-drying may be performed. The vacuum-drying may be performed under a pressure of about 0.03 atm to about 0.06 atm at about 100° C. to about 160° C.

A lithium secondary battery according to another embodiment includes the negative electrode, a positive electrode, and an electrolyte.

The lithium secondary battery may be a high power battery. In other words, the lithium secondary battery may be usefully applied to an electronic device requiring high power such as a power tool, an electric vehicle, a vacuum cleaner, and the like. The reason is that the lithium secondary battery including the negative electrode according to an embodiment may easily release heat generated during the charge and discharge, and particularly, when applied to a high-capacity cell and an electronic device for high power, may be suppressed from deterioration due to the heat and may be effectively used as a high power battery. In addition, the lithium secondary battery may easily release heat according to the charge and discharge and be effectively suppressed from a battery temperature increase and thus effectively improve cycle-life characteristics and particularly cycle-life characteristics at a high rate.

This high power battery may be a cylindrical, pouch-shaped battery, or stack-shaped battery. In addition, this cylindrical battery may be a 18650 battery (a diameter of 18 mm, a height of 65 mm) and a 21700 battery (a diameter of 21 mm, a height of 70 mm), but is not limited thereto.

The positive electrode may include a positive current collector and a positive electrode active material layer formed on the positive current collector. The positive electrode active material may include lithiated intercalation compounds that reversibly intercalate and deintercalate lithium ions. Specifically, one or more composite oxides of a metal selected from cobalt, manganese, nickel, and a combination thereof, and lithium, may be used. More specifically, the compounds represented by one of the following chemical formulae may be used. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 0$ $b \leq 0.5$, $0 \leq c \leq 0.5$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dGeO_2$ ($0.90 \leq a \leq 1.8$, $0 \leq b \leq 0.9$, $0 \leq c \leq 0.5$, $0 \leq d \leq 0.5$, $0.001 \leq c \leq 0.1$); $Li_aNiG_bO_2$ ($0.90 \leq a \leq 1.8$, $0.001 \leq b \leq 0.1$) $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiaFePO_4$ ($0.90 \leq a \leq 1.8$).

In the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive electrode active material by using these elements in the compound, and for example, the method may include any coating method such as spray coating, dipping, and the like, but is not illustrated in more detail since it is well-known in the related field.

In the positive electrode, a content of the positive electrode active material may be about 90 wt % to about 98 wt % based on the total weight of the positive electrode active material layer.

In an embodiment, the positive electrode active material layer may further include a binder and a conductive material. Herein, the binder and the conductive material may be included in an amount of about 1 wt % to about 5 wt %, respectively, based on the total amount of the positive electrode active material layer.

The binder improves binding properties of positive electrode active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene butadiene rubber, an acrylated styrene butadiene rubber, an epoxy resin, nylon, and the like, but are not limited thereto.

The conductive material is included to provide electrode conductivity, and any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may use Al, but is not limited thereto.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. Furthermore, the ketone-based solvent may include cyclohexanone and the like. The alcohol-based solvent may include ethyl alcohol, isopropyl alcohol, and the like, and examples of the aprotic solvent include nitriles such as R—CN (where R is a C2 to C20 linear, branched, or cyclic hydrocarbon, and may include a double bond, an aromatic ring, or an ether bond), amides such as dimethylformamide, dioxolanes such as 1,3-dioxolane, sulfolanes, and the like.

The organic solvent may be used alone or in a mixture. When the organic solvent is used in a mixture, the mixture ratio may be controlled in accordance with a desirable battery performance.

Furthermore, the carbonate-based solvent may include a mixture with a cyclic carbonate and a linear carbonate. The cyclic carbonate and linear carbonate are mixed together in a volume ratio of about 1:1 to about 1:9, and when the mixture is used as an electrolyte, it may have enhanced performance.

The organic solvent may further include an aromatic hydrocarbon-based solvent as well as the carbonate-based solvent. Herein, the carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 1.

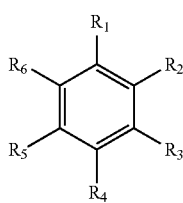

[Chemical Formula 1]

(In Chemical Formula 1, $R_1$ to $R_6$ are the same or different and are selected from hydrogen, a halogen, a C1 to C10 alkyl group, a haloalkyl group, and a combination thereof.)

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate, an ethylene carbonate-based compound represented by Chemical Formula 2, or propane sultone to improve cycle life.

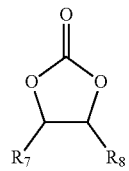

[Chemical Formula 2]

(In Chemical Formula 2, $R_7$ and $R_8$ are the same or different and may each independently be hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.)

Examples of the ethylene carbonate-based compound include difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle life may be flexibly used within an appropriate range.

The lithium salt dissolved in an organic solvent supplies a battery with lithium ions, basically operates the lithium secondary battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, for example integers of 1 to 20), LiCl, LiI, and $LiB(C_2O_4)_2$ (lithium bis(oxalato) borate: LiBOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

The lithium secondary battery may further include a separator between the negative electrode and the positive electrode, depending on a kind of the battery.

Examples of a suitable separator material include polyethylene, polypropylene, polyvinylidene fluoride, and multilayers thereof such as a polyethylene/polypropylene double-layered separator, a polyethylene/polypropylene/polyethylene triple-layered separator, and a polypropylene/polyethylene/polypropylene triple-layered separator.

Figure 3:
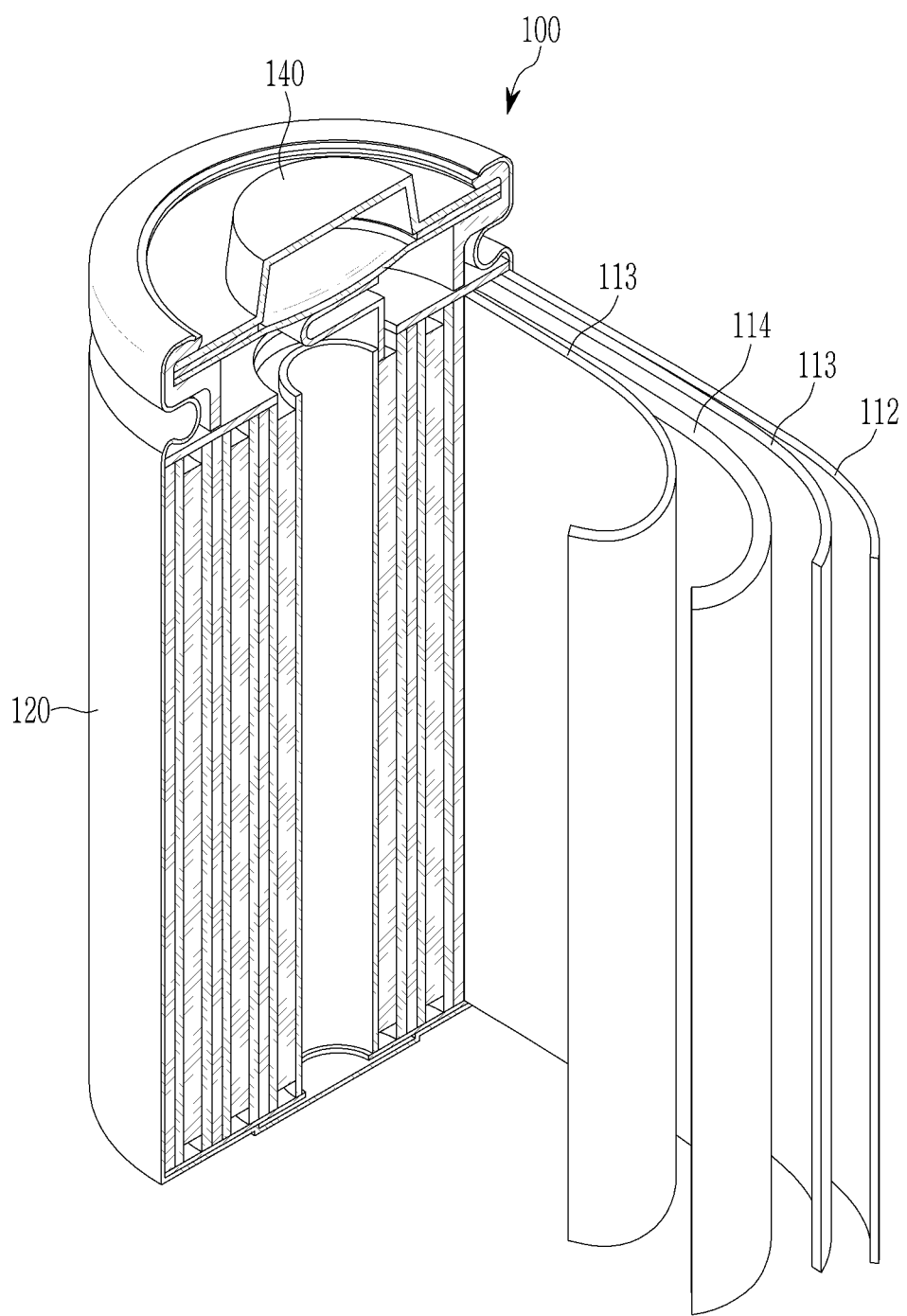
FIG. 3 is an exploded perspective view of a lithium secondary battery according to an embodiment of the present invention.

FIG. 3 is an exploded perspective view of a lithium secondary battery according to an embodiment. A lithium secondary battery according to an embodiment may be a cylindrical battery.

Referring to FIG. 3, a lithium secondary battery 100 is a cylindrical battery and includes a negative electrode 112, a positive electrode 114, and a separator 113, an electrolyte (not shown) immersed into the negative electrode 112, the positive electrode 114, and the separator 113, a battery case 120, and a sealing member 140 housing the battery case 120.

Such a lithium secondary battery 100 is manufactured by sequentially stacking the negative electrode 112, the separator 113, and the positive electrode, winding it in a spiral form, and housing it the battery case 120.

EXAMPLES

Hereinafter, examples of the present invention and comparative examples are described. These examples, however, are not in any sense to be interpreted as limiting the scope of the invention.

Example 1

97.5 wt % of artificial graphite, 1.5 wt % of styrene butadiene rubber, and 1.0 wt % of carboxymethyl cellulose were mixed with a water solvent to prepare a negative electrode active material slurry for a first layer, with a viscosity (at 25° C.) of 2500 cps.

97.5 wt % of artificial graphite, 1.5 wt % of styrene butadiene rubber, and 1.0 wt % of carboxymethyl cellulose were mixed with a water solvent to prepare a negative electrode active material slurry for a second layer, with a viscosity (at 25° C.) of 2000 cps.

A Cu foil was disposed under a magnet having a magnetic field strength of 4000 Gauss, and the negative electrode active material slurry for the first layer was coated on the Cu foil, while the Cu foil was moved to expose it to a magnetic field for 9 seconds, and dried to form a first layer with a one-side thickness of 100 μm, and the Cu foil was disposed under the magnet in order to present the other side of the Cu foil corresponding to the side on which the first layer was formed, and the negative electrode active material slurry for the first layer was coated on the Cu foil, while the Cu foil was moved to expose it to a magnetic field for 9 seconds, and dried to form a first layer with a one-side thickness of 100 μm. That is, the first layers were respectively formed on both sides of the Cu foil which corresponded to each other, and resultantly, the total thickness of the first layer on both sides was 200 μm.

Thereafter, similar to the first layer preparation process, the process including, by forming the negative electrode active material slurry for the second layer on the first layer, exposing it to a magnetic field for 9 seconds, and drying, was twice performed, to form a second layer with a total thickness of 70 μm.

After the first layer and the second layer were formed, compression and vacuum-drying (performed at 0.04 atm and 140° C.) were performed to a negative electrode having a one surface loading level (L/L) of 15 mg/cm$^2$. In the prepared negative electrode, each total thickness of the first layer and the second layer formed on both sides was 140 μm and 45 μm, after compressing. That is, the total thickness of the first layer formed on both sides was about 76% of the total thickness of the negative electrode active material layer. 96 wt % of LiCoO$_2$, 2 wt % of ketjen black, and 2 wt % of polyvinylidene fluoride were mixed in an N-methyl pyrrolidone solvent to prepare a positive electrode active material slurry. The positive electrode active material slurry was coated on an Al current collector, dried, and compressed to prepare a positive electrode.

The negative and positive electrodes and an electrolyte were used to manufacture a 18650-type cylindrical lithium secondary battery cell which is a full cell having capacity of 550 mAh and current density of 4.70 mAh/cm$^2$. Herein, the electrolyte was prepared by using a mixed solvent of ethylene carbonate and diethyl carbonate (50:50 volume ratio) and dissolving 1 M LiPF$_6$ therein.

Example 2

97.5 wt % of artificial graphite, 1.5 wt % of a styrene butadiene rubber, and 1.0 wt % of carboxymethyl cellulose were mixed with a water solvent to prepare a negative electrode active material slurry for a first layer, with a viscosity (at 25° C.) of 3500 cps.

96.5 wt % of artificial graphite, 1.5 wt % of styrene butadiene rubber, and 2.0 wt % of carboxymethyl cellulose were mixed with a water solvent to prepare a negative electrode active material slurry for a second layer, with a viscosity (at 25° C.) of 2000 cps. A negative electrode having a one side loading level of 15 mg/cm$^2$ which had a thickness of 200 μm of the first layer on both sides, and a thickness of 70 μm of the second layer on both sides before compressing and vacuum-drying, was prepared by the same procedure as in Example 1, except that the negative electrode active material slurry for the first layer and the negative electrode active material slurry for the second layer were used. In the negative electrode, each total thickness of the first layer and the second layer formed on both sides was 140 μm and 45 μm, after compressing and vacuum-drying. That is, the total thickness of the first layer formed on both sides was about 76% of the total thickness of the negative electrode active material layer.

Using the negative electrode, a lithium secondary battery was fabricated by the same procedure as in Example 1.

Example 3

97.0 wt % of artificial graphite, 1.5 wt % of styrene butadiene rubber, and 1.5 wt % of carboxymethyl cellulose were mixed with a water solvent to prepare a negative electrode active material slurry for a first layer, with a viscosity (at 25° C.) of 3300 cps.

96.5 wt % of artificial graphite, 1.5 wt % of styrene butadiene rubber, and 2.0 wt % of carboxymethyl cellulose were mixed with a water solvent to prepare a negative electrode active material slurry for a second layer, with a viscosity (at 25° C.) of 2000 cps. A negative electrode having a one side loading level of 15 mg/cm$^2$ which had a thickness of 202 μm of the first layer on both sides, and a thickness of 72 μm of the second layer on both sides before compressing and vacuum-drying, was prepared by the same procedure as in Example 1, except that the negative electrode active material slurry for the first layer and the negative electrode active material slurry for the second layer were used. In the negative electrode, each total thickness of the first layer and the second layer formed on both sides was 143 μm and 42 μm, after compressing and vacuum-drying. That is, the total thickness of the first layer formed on both sides was about 77% of the total thickness of the negative electrode active material layer.

Using the negative electrode, a lithium secondary battery was fabricated by the same procedure as in Example 1.

Example 4

97.5 wt % of artificial graphite, 1.5 wt % of a styrene butadiene rubber, and 1.0 wt % of carboxymethyl cellulose were mixed with a water solvent to prepare a negative electrode active material slurry for a first layer, with a viscosity (at 25° C.) of 3100 cps.

97.5 wt % of artificial graphite, 1.5 wt % of styrene butadiene rubber, and 1.0 wt % of carboxymethyl cellulose were mixed with a water solvent to prepare a negative electrode active material slurry for a second layer, with a viscosity (at 25° C.) of 2300 cps.

A negative electrode having a one side loading level of 15 mg/cm$^2$ which had a thickness of 201 μm of the first layer on both sides, and a thickness of 73 μm of the second layer on both sides before compressing and vacuum-drying, was prepared by the same procedure as in Example 1, except that the negative electrode active material slurry for the first layer and the negative electrode active material slurry for the second layer were used. In the negative electrode, each total thickness of the first layer and the second layer formed on both sides was 141 μm and 43 μm, after compressing and vacuum-drying. That is, the total thickness of the first layer formed on both sides was about 77% of the total thickness of the negative electrode active material layer.

Using the negative electrode, a lithium secondary battery was fabricated by the same procedure as in Example 1.

Example 5

97.5 wt % of artificial graphite, 1.5 wt % of a styrene butadiene rubber, and 1.0 wt % of carboxymethyl cellulose were mixed with a water solvent to prepare a negative electrode active material slurry for a first layer, with a viscosity (at 25° C.) of 2700 cps.

97.5 wt % of artificial graphite, 1.5 wt % of styrene butadiene rubber, and 1.0 wt % of carboxymethyl cellulose were mixed with a water solvent to prepare a negative electrode active material slurry for a second layer, with a viscosity (at 25° C.) of 2500 cps.

A negative electrode having a one-side loading level of 15 mg/cm$^2$ which had a thickness of 202 μm of the first layer on both sides, and a thickness of 70 μm of the second layer on both sides before compressing and vacuum-drying, was prepared by the same procedure as in Example 1, except that the negative electrode active material slurry for the first layer and the negative electrode active material slurry for the second layer were used. In the negative electrode, each total thickness of the first layer and the second layer formed on both sides was 142 μm and 43 μm, after compressing and vacuum-drying. That is, the total thickness of the first layer formed on both sides was about 77% of the total thickness of the negative electrode active material layer.

Using the negative electrode, a lithium secondary battery was fabricated by the same procedure as in Example 1.

Example 6

97.0 wt % of artificial graphite, 1.5 wt % of a styrene butadiene rubber, and 1.5 wt % of carboxymethyl cellulose were mixed with a water solvent to prepare a negative electrode active material slurry for a first layer, with a viscosity (at 25° C.) of 2500 cps.

97.0 wt % of artificial graphite, 1.5 wt % of styrene butadiene rubber, and 1.5 wt % of carboxymethyl cellulose were mixed with a water solvent to prepare a negative electrode active material slurry for a second layer, with a viscosity (at 25° C.) of 2000 cps.

A negative electrode having a one-side loading level of 15 mg/cm$^2$ which had a thickness of 200 μm of the first layer on both sides, and a thickness of 71 μm of the second layer on both sides before compressing and vacuum-drying, was prepared by the same procedure as in Example 1, except that the negative electrode active material slurry for the first layer and the negative electrode active material slurry for the second layer were used. In the negative electrode, each total thickness of the first layer and the second layer formed on both sides was 141 μm and 46 μm, after compressing and vacuum-drying. That is, the total thickness of the first layer formed on both sides was about 75% of the total thickness of the negative electrode active material layer.

Using the negative electrode, a lithium secondary battery was fabricated by the same procedure as in Example 1.

Comparative Example 1

97.5 wt % of artificial graphite, 1.5 wt % of styrene butadiene rubber, and 1.0 wt % of carboxymethyl cellulose were mixed with a water solvent to prepare a negative electrode active material slurry, with a viscosity (at 25° C.) of 2300 cps.

A Cu foil was disposed under a magnet having a magnetic field strength of 4000 Gauss, and the negative electrode active material slurry for the first layer was coated on the Cu foil, while the Cu foil was moved to expose it to a magnetic field for 12 seconds, and dried to form a first layer with a one-side thickness of 100 μm, and the Cu foil was disposed under the magnet in order to present the other side of the Cu foil corresponding to the side on which the first layer was formed, and the negative electrode active material slurry for the first layer was coated on the Cu foil, while the Cu foil was moved to expose it to a magnetic field for 12 seconds, and dried to form a first layer with a one-side thickness of 100 μm. That is, the first layers were respectively formed on both sides of the Cu foil which corresponded to each other, and resultantly, the total thickness of the first layer on both sides was 200 μm.

After the first layer was formed, compression was performed to a negative electrode having a one surface loading level (L/L) of 15 mg/cm$^2$.

In the prepared negative electrode, the total thickness of the first layer formed on both sides was 185 μm, after compressing and vacuum-drying.

Using the negative electrode, a lithium secondary battery was fabricated by the same procedure as in Example 1.

Comparative Example 2

97.5 wt % of artificial graphite, 1.5 wt % of a styrene butadiene rubber, and 1.0 wt % of carboxymethyl cellulose were mixed with a water solvent to prepare a negative electrode active material slurry for a first layer, with a viscosity (at 25° C.) of 5000 cps.

97.5 wt % of artificial graphite, 1.5 wt % of styrene butadiene rubber, and 1.0 wt % of carboxymethyl cellulose were mixed with a water solvent to prepare a negative electrode active material slurry for a second layer, with a viscosity (at 25° C.) of 1800 cps.

A Cu foil was disposed under a magnet having a magnetic field strength of 4000 Gauss, and the negative electrode active material slurry for the first layer was coated on the Cu foil, while the Cu foil was moved to expose it to a magnetic field for 12 seconds, and dried to form a first layer with a one-side thickness of 100 μm, and the Cu foil was disposed under the magnet in order to present the other side of the Cu foil corresponding to the side on which the first layer was formed, and the negative electrode active material slurry for the first layer was coated on the Cu foil, while the Cu foil was moved to expose it to a magnetic field for 12 seconds, and dried to form a first layer with a one-side thickness of 100 μm. That is, the first layers were respectively formed on both sides of the Cu foil which corresponded to each other, and resultantly, the total thickness of the first layer on both sides was 200 μm.

Thereafter, similar to the first layer preparation process, the process including, by forming the negative electrode active material slurry for the second layer on the first layer, exposing it to a magnetic field for 12 seconds, and drying, was twice performed, to form a second layer with a total thickness of 70 μm.

After the first layer and the second layer were formed, compression and vacuum-drying were performed to a negative electrode having a one surface loading level (L/L) of 15 mg/cm². In the prepared negative electrode, each total thickness of the first layer and the second layer formed on both sides was 140 μm and 44 μm, after compressing.

Using the negative electrode, a lithium secondary battery was fabricated by the same procedure as in Example 1.

Comparative Example 3

97.5 wt % of artificial graphite, 1.5 wt % of a styrene butadiene rubber, and 1.0 wt % of carboxymethyl cellulose were mixed with a water solvent to prepare a negative electrode active material slurry for a first layer, with a viscosity (at 25° C.) of 2000 cps.

97.5 wt % of artificial graphite, 1.5 wt % of styrene butadiene rubber, and 1.0 wt % of carboxymethyl cellulose were mixed with a water solvent to prepare a negative electrode active material slurry for a second layer, with a viscosity (at 25° C.) of 1800 cps.

A Cu foil was disposed under a magnet having a magnetic field strength of 4000 Gauss, and the negative electrode active material slurry for the first layer was coated on the Cu foil, while the Cu foil was moved to expose it to a magnetic field for 9 seconds, and dried to form a first layer with a one-side thickness of 100 μm, and the Cu foil was disposed under the magnet in order to present the other side of the Cu foil corresponding to the side on which the first layer was formed, and the negative electrode active material slurry for the first layer was coated on the Cu foil, while the Cu foil was moved to expose it to a magnetic field for 9 seconds, and dried to form a first layer with a one-side thickness of 100 μm. That is, the first layers were respectively formed on both sides of the Cu foil which corresponded to each other, and resultantly, the total thickness of the first layer on both sides was 200 μm.

Thereafter, similar to the first layer preparation process, the process including, by forming the negative electrode active material slurry for the second layer on the first layer, exposing it to a magnetic field for 20 seconds, and drying, was twice performed, to form a second layer with a total thickness of 70 μm.

After the first layer and the second layer were formed, compression and vacuum-drying were performed to a negative electrode having a one surface loading level (L/L) of 15 mg/cm². In the prepared negative electrode, each total thickness of the first layer and the second layer formed on both sides was 141 μm and 45 μm, after compressing.

Using the negative electrode, a lithium secondary battery was fabricated by the same procedure as in Example 1.

Example 7

A negative electrode having a cross-section loading level (L/L) of 15 mg/cm² was prepared by the same procedure as in Example 3, except that each total thickness of the first layer and the second layer formed on both sides was 115 μm and 70 μm. That is, the total thickness of the first layer formed on both sides was about 62% of the total thickness of the negative electrode active material layer.

Using the negative electrode, a lithium secondary battery was fabricated by the same procedure as in Example 3.

Example 8

A negative electrode having a cross-section loading level (L/L) of 15 mg/cm² was prepared by the same procedure as in Example 3, except that each total thickness of the first layer and the second layer formed on both sides was 128 μm and 57 μm. That is, the total thickness of the first layer formed on both sides was about 69% of the total thickness of the negative electrode active material layer.

Using the negative electrode, a lithium secondary battery was fabricated by the same procedure as in Example 3.

Example 9

A negative electrode having a cross-section loading level (L/L) of 15 mg/cm² was prepared by the same procedure as in Example 3, except that each total thickness of the first layer and the second layer formed on both sides was 142 μm and 43 μm. That is, the total thickness of the first layer formed on both sides was about 77% of the total thickness of the negative electrode active material layer.

Using the negative electrode, a lithium secondary battery was fabricated by the same procedure as in Example 3.

Measurement of X-Ray Diffraction Characteristic

The lithium secondary cells according to Example 1 to 9 and Comparative Examples 1 to 3 were charged and discharged at 0.1 C twice, and fully discharged at 0.1 C to 2.75 V. The DD value of the first layer was obtained by measuring XRD of the adjacently attached portion to the current collector which was obtained by separating the negative electrode active material layer from the current collector using a tape, after charging and discharging.

The fully-discharged battery cells were disassembled to obtain negative electrodes. As for these negative electrodes, X'Pert (PANalytical B.V.) XRD equipment using a CuKα ray as a target ray was used, but monochromator equipment was removed in order to improve a peak intensity resolution. Herein, the measurement was performed under a condition of 2θ=10° to 80°, a scan speed (°/S)=0.06436, and a step size of 0.026°/step.

From the measured XRD results, the DD values of the total negative electrode active material layer and the first layer were calculated, and the results are shown in Table 1.

The areas of the peaks shown at 2θ=26.5±0.2° ((002) plane), 42.4±0.2° ((100) plane), 43.4±0.2° ((101) R plane), 44.6±0.2° ((101) H plane), 54.7±0.2° ((004) plane), and 77.5±0.2° ((110) plane) were measured, and the area sum of peaks shown at 2θ=42.4±0.2° ((100) plane), 43.4±0.2° ((101)R plane), 44.6±0.2° ((101)H plane), and 77.5±0.2° ((110) plane) as $I_a$, and the area sum of peaks shown at 2θ=26.5±0.2° ((002) plane), 42.4±0.2° ((100) plane), 43.4±0.2° ((101)R plane), 44.6±0.2° ((101)H plane), 54.7±0.2° ((004) plane), and 77.5±0.2° ((110) plane) as $I_{total}$, and DD ($I_{total}/I_a$) was obtained by calculating from the values. The results are shown in Table 1. As the negative electrode active material layer was a single layer in Comparative Example 1, the DD value of the negative electrode active material layer was indicated as the DD value of the first layer, and the total DD value and the DD value of the first layer were the same.

Furthermore, the $I_{(004)}/I_{(002)}$ and $I_{(110)}/I_{(004)}$ were calculated, and the results are shown in Table 2. In particular, a peak at 43.4±0.2° appeared by overlapping a peak of a (101)R plane of graphite with another peak of a (111) plane of a Cu current collector.

Rate-Capability Characteristic Evaluation

The lithium secondary cells according to Examples 1 to 9 and Comparative Examples 1 to 3 were charged at each C-rate of 0.2 C, 0.5 C, 1 C, 1.5 C, and 2.0 C once, and the capacity ratio of each 2 C-rate to 0.2 C were measured. The results are shown in Table 1.

TABLE 1

|  | DD of negative electrode active material layer | DD of first layer | DD of first layer/DD of negative electrode active material layer (%) | Rate-capability characteristic (%) (2 C/0.2 C) |
|---|---|---|---|---|
| Example 1 | 60 | 54 | 90 | 75.6 |
| Example 2 | 60 | 18 | 30 | 70.5 |
| Example 3 | 58 | 23.2 | 40 | 72.1 |
| Example 4 | 55 | 33 | 60 | 72.9 |
| Example 5 | 57 | 39.9 | 70 | 75.0 |
| Example 6 | 57 | 45.6 | 80 | 74.9 |
| Example 7 | 60 | 24 | 40 | 71.1 |
| Example 8 | 55 | 22 | 40 | 71.8 |
| Example 9 | 50 | 20 | 40 | 72.1 |
| Comparative Example 1 | 54 | 54 | 100 | 65.1 |
| Comparative Example 2 | 55 | 10.8 | 20 | 60.1 |
| Comparative Example 3 | 54 | 51.3 | 95 | 63.9 |

As shown in Table 1, Examples 1 to 9 in which the DD value of the first layer corresponded to about 30% to about 90% of the DD value of the negative electrode active material layer exhibited excellent rate capability, compared to Comparative Examples 1 to 3.

TABLE 2

|  | $I_{(004)}/I_{(002)}$ | $I_{(110)}/I_{(004)}$ |
|---|---|---|
| Example 1 | 0.07 | 0.7 |
| Example 2 | 0.059 | 0.69 |
| Example 3 | 0.042 | 0.68 |
| Example 4 | 0.044 | 0.65 |
| Example 5 | 0.044 | 0.59 |
| Example 6 | 0.051 | 0.59 |
| Example 7 | 0.046 | 0.58 |
| Example 8 | 0.044 | 0.51 |
| Example 9 | 0.048 | 0.47 |
| Comparative Example 1 | 0.045 | 0.51 |
| Comparative Example 2 | 0.046 | 0.35 |
| Comparative Example 3 | 0.048 | 0.48 |

As shown in Table 2, the negative electrodes according to Examples 1 to 9 and Comparative Examples 1 to 3 had $I_{(004)}/I_{(002)}$ of 0.04 or more, and 0.07 or less, and $I_{(110)}/I_{(004)}$ of 0.3 or more, and 0.7 or less.

BET Evaluation

The lithium secondary battery cells according to Examples 1 to 9 and Comparative Examples 1 to 3 were charged and discharged at 0.1 C and fully discharged to 3 V, and then disassembled to obtain negative electrodes. The negative electrodes were respectively used to obtain each 5 cm×5 cm size sample, these samples were respectively cut into a size of 0.5 cm×0.5 cm and put in a BET sample holder, and then their BET's were measured in a nitrogen gas adsorption method, and the results are shown in Table 3.

TABLE 3

|  | BET (m$^2$/g) |
|---|---|
| Example 1 | 0.71 |
| Example 2 | 0.72 |
| Example 3 | 0.69 |
| Example 4 | 0.70 |
| Example 5 | 0.75 |
| Example 6 | 0.74 |
| Example 7 | 0.70 |
| Example 8 | 0.71 |
| Example 9 | 0.72 |
| Comparative Example 1 | 0.72 |
| Comparative Example 2 | 0.71 |
| Comparative Example 3 | 0.75 |

As shown in Table 3, the specific surface areas of the negative electrodes according to Examples 1 to 9 and Comparative Examples 1 to 3 were also 0.6 m$^2$/g to 2.0 m$^2$/g.

Cycle-Life Characteristic Evaluation

The full cells of Examples 1 to 9 and Comparative Examples 1 to 3 were respectively constant current/constant voltage charged under a condition of 1.0 C, 4.4 V, and a 0.1 C cut-off at room temperature (25° C.), paused for 5 minutes, and constant current discharged under a condition of 1.0 C and a 3.0 V cut-off and paused for 5 minutes as one cycle, and this cycle was repeated 200 times. A capacity retention depending on a charge and discharge cycle was evaluated by calculating a discharge capacity ratio at each cycle relative to discharge capacity at the first cycle.

The results are shown in Table 4.

TABLE 4

|  | DD of negative electrode active material layer | DD of first layer | DD of first layer/DD of negative electrode active material layer (%) | Cycle characteristic (%) |
|---|---|---|---|---|
| Example 1 | 60 | 54 | 90 | 85.2 |
| Example 2 | 60 | 18 | 30 | 80.2 |
| Example 3 | 58 | 23.2 | 40 | 80.8 |
| Example 4 | 55 | 33 | 60 | 81.1 |
| Example 5 | 57 | 39.9 | 70 | 85.8 |
| Example 6 | 57.1 | 45.6 | 80 | 86.2 |
| Example 7 | 60 | 24 | 40 | 80.8 |
| Example 8 | 55 | 22 | 40 | 80.1 |
| Example 9 | 50 | 20 | 40 | 80.5 |
| Comparative Example 1 | 54 | 54 | 100 | 75.1 |
| Comparative Example 2 | 55 | 10.8 | 20 | 74.3 |
| Comparative Example 3 | 54 | 51.3 | 95 | 73.8 |

As shown in Table 4, Examples 1 to 6 in which the DD value of the first layer corresponded to 30% to 90% of the DD value of the negative electrode active material layer exhibited an excellent cycle-life characteristic, compared with Comparative Example 1 in which only the first layer was formed, and Comparative Examples 2 and 3 in which the DD value of the first layer corresponded to 20% and 95% of the DD value of the negative electrode active material layer, respectively.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. A negative electrode for a lithium secondary battery, the negative electrode comprising:
   a current collector; and
   a negative electrode active material layer including:
      a first layer formed on two opposing major sides of the current collector and comprising a first carbon-based negative electrode active material, and
      a second layer formed on the first layer on the two opposing major sides of the current collector, the second layer and comprising a second carbon-based negative electrode active material,
   wherein:
   a DD (Degree of Divergence) value of the first layer is 30% to 90% of a DD value of the negative electrode active material layer and,
   the DD value is defined by Equation 1:

DD(Degree of Divergence)=$(I_a/I_{total})*100$  [Equation 1]

In Equation 1,
   $I_a$ is a sum of peak intensities at non-planar angles measured by XRD using a CuKα ray, and
   $I_{total}$ is a sum of peak intensities at all angles measured by XRD using a CuKα ray.

2. The negative electrode for the lithium secondary battery of claim 1, wherein the DD value of the first layer is 70% to 90% of the DD value of the negative electrode active material layer.

3. The negative electrode for the lithium secondary battery of claim 1, wherein a total thickness of the first layer disposed on the two opposing major sides is 80 μm to 800 μm.

4. The negative electrode for the lithium secondary battery of claim 1, wherein a total thickness of the second layer disposed on the two opposing major sides is 20 μm to 200 μm.

5. The negative electrode for the lithium secondary battery of claim 1, wherein a total thickness of the negative electrode active material layer disposed on the two opposing major sides is 100 μm to 1000 μm.

6. The negative electrode for the lithium secondary battery of claim 1, wherein a total thickness of the first layer disposed on the two opposing major sides is 80% or less of a total thickness of the negative electrode active material layer disposed on the two opposing major sides.

7. The negative electrode for the lithium secondary battery of claim 1, wherein the DD value of the negative electrode active material layer is 19 to 60.

8. The negative electrode for the lithium secondary battery of claim 1, wherein the DD value of the first layer is 18 to 54.

9. The negative electrode for the lithium secondary battery of claim 1, wherein:
   the non-planar angles measured by XRD using a CuKα ray are 2θ=42.4±0.2°, 43.4±0.2°, 44.6±0.2°, and 77.5±0.2°, and
   all the angles measured by XRD using a CuKα ray are 2θ=26.5±0.2°, 42.4±0.2°, 43.4±0.2°, 44.6±0.2°, 54.7±0.2°, and 77.5±0.2°.

10. The negative electrode for the lithium secondary battery of claim 1, wherein each of $I_a$ and $I_{total}$ are a peak integral area value.

11. The negative electrode for the lithium secondary battery of claim 1, wherein the first carbon-based negative electrode active material or the second carbon-based negative electrode active material is artificial graphite or a mixture of artificial graphite and natural graphite.

12. The negative electrode for the lithium secondary battery of claim 1, wherein the first layer or the second layer further includes a Si-based negative electrode active material, a Sn-based negative electrode active material, a lithium vanadium oxide, or a combination thereof.

13. A lithium secondary battery, comprising:
   the negative electrode of claim 1;
   a positive electrode; and
   an electrolyte.

* * * * *